United States Patent [19]

Budrose

[11] 4,044,393
[45] Aug. 23, 1977

[54] HAND GUIDED TAPE PLAYER

[75] Inventor: Charles R. Budrose, Melrose, Mass.

[73] Assignee: Upaya, Inc., Saugus, Mass.

[21] Appl. No.: 595,521

[22] Filed: July 14, 1975

[51] Int. Cl.$^2$ .................... G11B 21/02; G11B 5/10
[52] U.S. Cl. .................. 360/117; 35/35 C; 360/128
[58] Field of Search ............ 360/117, 128, 131, 129, 360/2, 130; 35/35 C

[56] References Cited

U.S. PATENT DOCUMENTS

| | | | |
|---|---|---|---|
| 2,548,011 | 4/1951 | Frost | 360/117 |
| 3,376,551 | 4/1968 | Armbruster | 360/117 |
| 3,521,007 | 7/1970 | Laghaie | 360/117 |
| 3,529,101 | 9/1970 | Dubord | 360/117 |
| 3,674,943 | 7/1972 | Benson | 360/117 |
| 3,767,208 | 10/1973 | Chernowitz | 360/117 |

OTHER PUBLICATIONS

IBM Technical Disclosure Bulletin, Morrissey, Audio-visual System Using Manual Mechanism for Reading Magnetic Stripe Meidia, vol. 7, No. 7, Dec. 1974, pp. 2164–2165.

Primary Examiner—Alfred H. Eddleman
Attorney, Agent, or Firm—Wolf, Greenfield & Sacks

[57] ABSTRACT

The device is configured so that it is easily held in the user's hand and thereby guided along a strip of recording tape attached to a card, sheet of paper or plastic sheet and having a predetermined message recorded thereon. The device includes a motor for self-propelling the device at the proper tape recording speed. A transducer is mounted for intimate contact with the recording tape as finger and hand pressure are applied. A visual marker or pointer on the device is used for visually guiding the device along the tape. For use with a blind person an embossed ridge may be provided on the card adjacent the tape to permit proper guidance of the device. When using letter-size sheets or cards, it is preferred that a plurality of tape strips be used, each having a message or other indicia associated therewith.

13 Claims, 7 Drawing Figures

HAND GUIDED TAPE PLAYER

BACKGROUND OF THE INVENTION

The present invention relates in general to a tape player, and is more particularly, concerned with a hand held and guided tape reader for playing or reading recorded tape attached to cards, sheets of paper or plastic sheets.

There presently exists a number of recorder-players for use with cards containing a recording tape or other recording medium attached to them. See for example, my U.S. Pat. Nos. 3,860,961 and 3,852,817. These prior art devices have been developed primarily for use in the education field where it is desirable to present short segments of paired audio and visual information. For example, in learning to read a student may be provided with a card which has a word visually printed on it with the corresponding verbal representation being recorded on the tape. This mode of learning has certain advantages associated with it. It is easy for the teacher to prepare the material and to tailor the materials to a particular students need. This is especially so in learning vocabulary words, for example. Also, with this mode of learning the student is actively involved with the material by selecting and inserting the cards into the player thereby increasing the student's interest in the ongoing education process. The study-practice period is student paced and the student can select certain areas for emphasized practice.

However, there are some disadvantages associated with these prior art devices. These devices are usually relatively cumbersome and sometimes present some difficulty to the user in gaining knowledge of operation of the device. Many of these prior art devices include an adapter for receiving the card for use with a conventional recorder-player. The resultant device is, as previously mentioned, somewhat cumbersome and can be relatively expensive.

With these prior art devices the card carries only one message. Thus, if two or more related pieces of information are to be studied (or one long sequence), there is an interruption of the information because the user must insert separate cards. With this arrangement, the student must put one card in the player, listen to the recorded message, remove it from the machine, and install the next card.

Accordingly, one object of the present invention is to provide a hand held and guided tape reader for listening to messages recorded on a recording tape or other recording medium.

Another object of the present invention is to provide a reader that is easily hand held and that is not cumbersome to use.

A further object of the present invention is to provide a reader as set forth in the preceeding objects and that is relatively inexpensive to make.

Another object of the present invention is to provide, for use with a hand held tape reader, a card that may be of letter-size having a plurality of recording strips thereon each having a message or other indicia associated therewith. These cards may also have an embossed ridge associated with each strip of recording tape for use with a blind person.

SUMMARY OF THE INVENTION

To accomplish the foregoing and other objects of this invention, there is provided a hand held and guided tape player which in one embodiment comprises a chassis or base member, a transducer, means for mounting the transducer to the base with the transducer extending at least partially below the base and a housing which is coupled to the base. As the device is moved over a recording medium the signal is picked up by the transducer and the device additionally comprises means coupled to the transducer for producing an audio sound corresponding to a message recorded on the recording medium.

In the preferred embodiment the device is self-propelled and the housing is, in effect, provided in two separate parts one of which contains the drive motor and the other of which fits over the chassis and contains the transducer. The chassis has propelling means associated therewith such as a pair of wheels driven from the motor for propelling the device when placed in contact with a card or the like having the recording medium thereon. The device is preferably used by grasping the housing containing the motor and resting at least one of the fingers on the other housing and applying a pressure with the finger so that the transducer and propelling means is in intimate contact with the card.

In accordance with one other aspect of the present invention the card may be of letter-size and have a plurality of tape strips associated therewith. Each of the strips has a corresponding message associated with it and in this way, with the use of the reader of the present invention, the user can move from one message to the other quite readily.

In accordance with another aspect of this invention, the letter-size card can be provided with an embossed ridge. This arrangement is preferably used with blind persons so that they can guide the player along the recording medium.

BRIEF DESCRIPTION OF THE DRAWINGS

Numerous other objects, features and advantages of the invention will now become apparent upon a reading of the following detailed description taken in conjunction with the accompanying drawings, in which.

DETAILED DESCRIPTION

Figure 5:
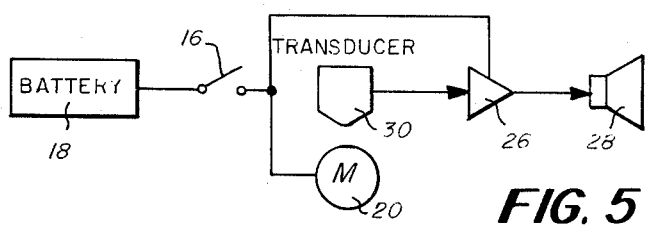
FIG. 5 is a schematic block diagram of the electronics associated with the device shown in FIGS. 1–4.
Figure 6:
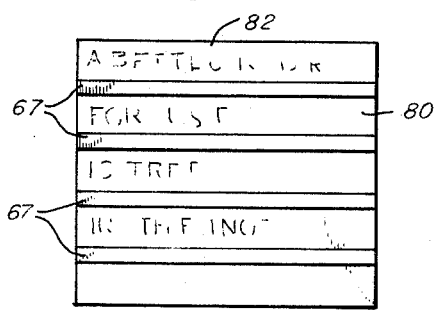
FIG. 6 shows a recording sheet for use with the device shown in FIGS. 1–4.
Figure 7:
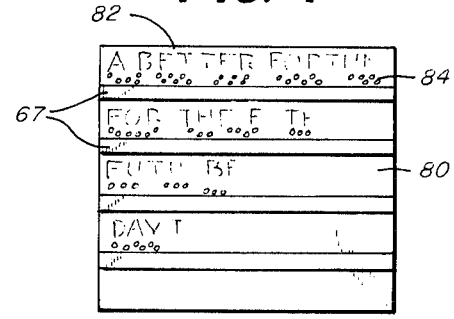
FIG. 7 shows an alternate embodiment for the recording sheet for use with a blind person.

FIGS. 1–4 illustrate one embodiment of a device of the present invention. FIG. 5 shows a schematic block diagram associated with that device. FIGS. 6 and 7 are concerned with the recording medium used with the device.

The device generally comprises a chassis, a means for propelling the chassis, a recording-sensing means and means to facilitate the alignment of the device in correct contact with a recording tape attached to a surface.

Figure 1:
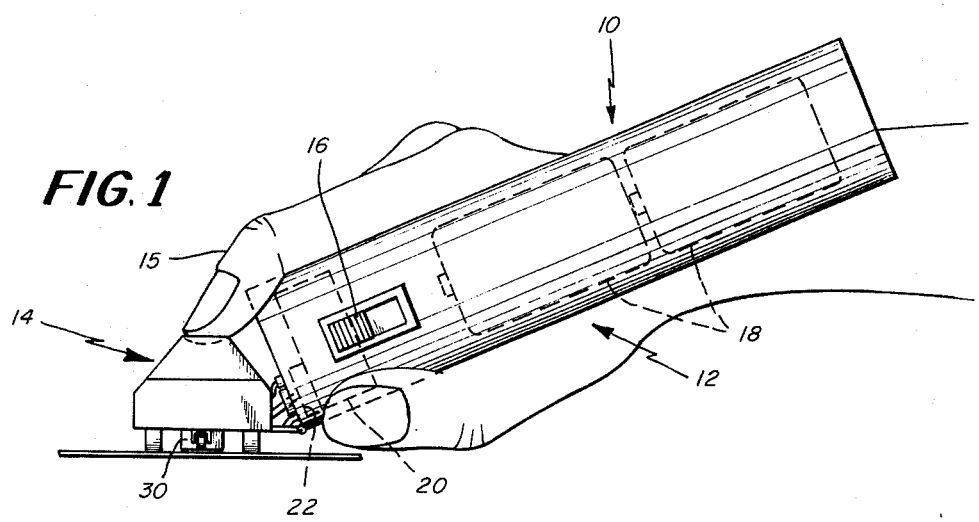
FIG. 1 shows the device in use.

Referring now, in particular, to FIGS. 1–4, the device generally comprises an elongated housing 10 which is shown in FIG. 1 as being held by the operator's hand 12, and a smaller housing 14 which is contacted on the top by the index finger 15.

The housing 10 has an on-off slide switch 16 disposed therealong which can be easily operated by the thumb or forefinger. Alternatively, the switch 16 may be disposed in the housing 14 and be actuated by the index finger. A small switch lever could be implanted in wall 35. The housing 10 also preferably contains one or more batteries 18, a motor 20 and possibly a speed reduction means 22 coupled between the output of the motor and the flexible drive shaft 24 shown in FIG. 2.

The electrical connection of some of the components shown in FIG. 1 is illustrated in the schematic block diagram of FIG. 5. The battery 18 may be coupled by way of the slide switch 16 to both the motor 20 and an amplifier 26. The output from the transducer 30 coupled by way of the amplifier 26 to an output speaker 28. Although the amplifier 26 has been shown as an integral part of the device, the amplifier may also be an amplifier that is externally connected to the device. When the switch 16 is open no power is applied to the motor and the amplifier is inoperative. When the switch 16 is closed, power is coupled to the motor 20 for propelling the housing 14 and also to the amplifier 26 for powering the amplifier.

The housing 14 contains the transducer 30 and is supported and driven by a pair of rubber wheels 32. The housing 14 may be constructed of a molded plastic material and includes enclosing upright walls 33 and slanted walls 34 terminating at their top end in a concave wall 35 for accommodating the finger 15 as shown in FIG. 1. The housing 14 is enclosed at its open bottom end by means of the base support chassis 36 which may be a rectangular metal plate. This chassis 36 provides a means for supporting the wheels 32 and the transducer 30.

The two rubber wheels 32 are mounted to metal hubs 38 which are in turn supported by common shaft 40. The shaft 40 is supported above the chassis 36 by means of bearing posts 42. A suitable coupling 44 interconnects shaft 40 with flexible shaft or cable 24 which in turn connects to the output shaft of the motor 20 or to the gear reduction means 22 shown in FIG. 1 if a gear reduction means is employed. When the switch 16 is closed, as previously mentioned, the motor is energized and the wheels 32 are rotated. To provide three point contact a follower caster 46 is also provided. This caster is suitably supported from the bottom of the chassis 36.

The sensing head or transducer 30 has oppositely disposed flanges 48 extending therefrom. These flanges are used to mount the transducer to plate 50 by means of a pair of screws 52. One of the screws 52, preferably the right hand one shown in FIG. 3, may be referred to as an azimuth adjusting screw. To provide this adjustment there may be provided a spring (not shown) placed between the right hand screw 52 as viewed in FIG. 3 and flange 48 with the spring encircling screw 52. The turning of screw 52 either compresses or relaxes the spring, giving azimuth movement to the head as shown by the arrow 53 in FIG. 4. The azimuth adjustment can also be accomplished by using the right hand screw 60 as viewed in FIG. 4 by making the accommodating hole in band spring 58 a slot.

The plate 50 is in turn supported by and attached to the vertical leg of the angle bracket 54 by means of an adjusting screw 55. When the adjusting screw 55 is loosened, plate 50 and the attached transducer may be rotated about screw 55 relative to the support angle 54. This permits adjustment of the transducer 30 relative to the tape surface 57. When the proper adjustment has been determined then the adjusting screw 55 can be tightened to a locked position.

Figure 3:
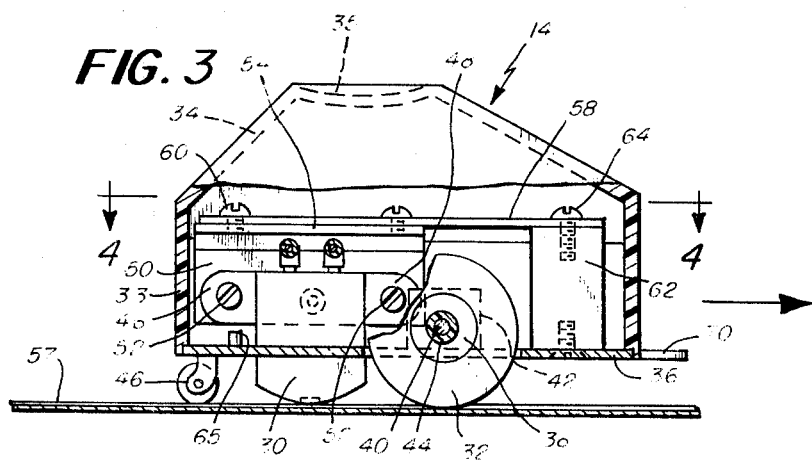
FIG. 3 is a cross-sectional view taken along line 3—3 of FIG. 2.

The support angle 54 is supported by means of a band spring 58 which is secured by means of screws 60 through the horizontal leg of the support angle 54. The opposite end of the band spring 58 is secured to spring support post 62 by means of another pair of screws 64. The post 62 is also secured at its bottom end by suitable means to the top surface of the chassis 36 as shown in FIG. 3. The band spring 58 and the related components are designed so that the spring is tensioned to urge the head assembly downward and when the device is not on a surface, the head 30 protrudes below the plane of the support points defined by the wheels 32 and the caster 46. A stop 65 limits the downward movement of the transducer 30 when the device is not on the surface 57.

Figure 4:
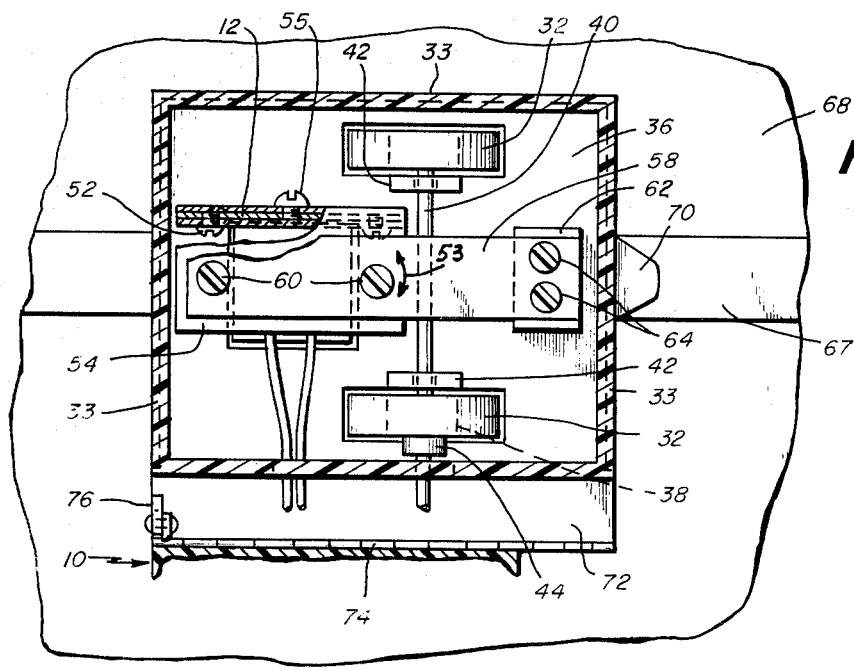
FIG. 4 is a cross-sectional view taken along line 4—4 of FIG. 3.

FIG. 4 shows in addition to the device, a strip of recording tape 67 attached to a sheet of material 68. The tape 67 has a surface 57 as indicated in FIG. 3. In order to provide proper guidance of the device along the tape 67, the chassis 36 is provided with a protruding lip 70 which is somewhat pointed and of about the same width as the width of the tape 67. This lip permits visual alignment of the device with the tape by centering the lip on the tape as indicated in FIG. 4.

As previously indicated, the housing 14 is provided with a concave indentation 35 on the top thereof. When the device is in use, the operator applies pressure to the indentation 35 with his or her index finger to hold the device against the surface upon which it is to travel. Previously, the switch 16 can be moved to its operative position so that the device can be self-propelled. The pressure that is applied by the forefinger also loads the band spring 58 which in turn holds the transducer head 30 in intimate contact with the tape surface 57. The pressure of spring 58 may be slightly varied by adjusting screw 52.

Figure 2:
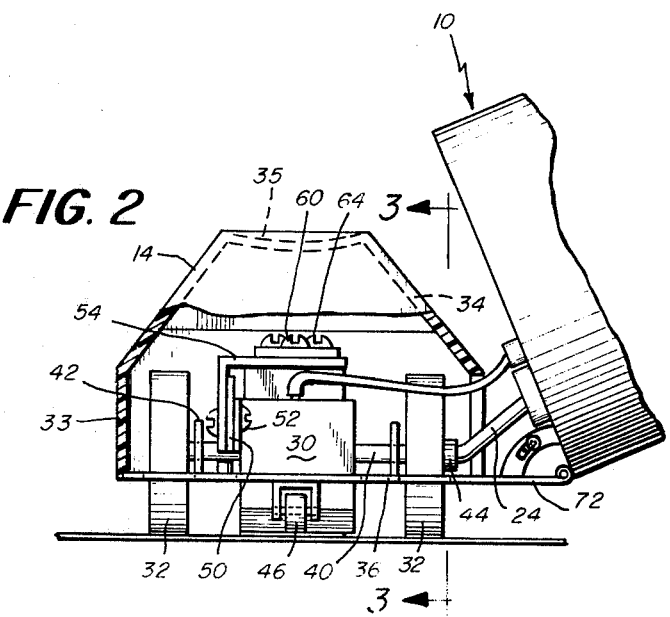
FIG. 2 is a fragmentary cut-a-way view of the device of FIG. 1.

As indicated in FIGS. 2 and 4, the chassis 36 includes an extension 72 that permits hinging of the chassis to the housing 10 by means of a hinge pin 74. Also coupled intermediate housing 10 and extension 72 is a bracket 76 which limits the movement around the hinge pin 74 to approximately a 20° arc of movement.

The device of the present invention has thus far been discussed in association with a recording medium comprising a single tape 67 as indicated in FIG. 4. However, in accordance with the present invention it is preferred that this device be usable with a sheet 80 as indicated in FIG. 6 having a plurality of tapes 67. In FIG. 6 four such tapes are shown and each has a predetermined message recorded thereon. Above each tape, the identical predetermined message is written out. A series of sentences comprising a story could be written on the total sheet. The student could attempt to read each line of indicia 82 and then listen to the corresponding message on the tape adjacent thereto. The sheet 80 may be a paper sheet, a card or a plastic sheet. The sheet could be bound with other sheets or could be included in a loose leaf holder.

Still another embodiment for the sheet 80 is shown in FIG. 7. This embodiment also comprises a plurality of tape strips 67 and indicia 82. In addition, there is a braille lettering 84 intermediate the indicia and the tape strip 67. There is preferably also a solid continuous embossed ridge shown just below the braille lettering.

This embodiment is particularly useful for a blind person. The indicia 82 may be ink printed on the sheet. The blind person reads by means of his fingers the braille message being guided by the embossed ridge and operates the machine, again being guided by the ridge, to listen to the recorded message. In this connection, it is noted that in FIG. 1 the fore finger is used for guiding the machine. If a blind person were using the machine the next adjacent finger could be used to sense the embossed ridge. Also, the braille lettering 82 in FIG. 7 may actually function as an embossment thus possibly eliminating the ridge. In that manner, the person could use the printed indicia as a guide for using the device to read the message on the tape 67.

Having described one embodiment of the device of the present invention, it should now be apparent that numerous other embodiments are contemplated as falling within the scope of this invention. For example, one device has been disclosed for reading from the recording medium, namely an electronic transducer. An alternative arrangement might include a mechanical-groove cut recording technique. With this technique sound production is provided by way of a needle and paper cone and propulsion may be provided by way of a wind-up spring motor or even by mechanically governed hand movement. In this case the recording medium may be plastic strips applied to paper, plastic or a card.

What is claimed is:

1. A hand held and guided player for use with a card or the like having a recording medium thereon and comprising:
    a chassis,
    a transducer means,
    means for mounting the transducer means on said chassis in a position so that said transducer means can contact said medium and including biasing means for urging the transducer means downwardly,
    wheel means extending at least in part below the chassis for supporting the chassis for movement over the recording medium surface,
    means for coupling driving power to the wheel means for propelling the chassis at a predetermined fixed rate,
    means coupled from said transducer means for providing an audio sound corresponding to a message recorded on the recording medium,
    and a first housing covering said chassis and a second housing containing at least part of said means for propelling,
    said means for supporting including at least two wheels and an interconnecting shaft, said means for propelling including a motor having a flexible output shaft coupled to said interconnecting shaft.

2. A player as set forth in claim 1 wherein said wheel means comprises at least two wheels and an interconnecting shaft and said means for propelling includes a motor coupled to the shaft and switch means for selectively operating said motor.

3. A player as set forth in claim 1 wherein the means for mounting the transducer means includes a biasing arm for urging the transducer means downwardly below the chassis so that when the support means for the chassis is resting on or adjacent the recording medium the transducer means is forced into intimate contact with the recording medium.

4. A player as set forth in claim 1 wherein said recording medium includes a strip of magnetic recording tape and said transducer means comprises an electromagnetic transducer head.

5. A player as set forth in claim 1 wherein said means for mounting the transducer means includes a biasing means for urging the transducer means downwardly.

6. A player as set forth in claim 1 including hinge means for connecting said first and second housings.

7. A player as set forth in claim 6 wherein said motor is contained in said second housing and said flexible shaft extends between said first and second housings.

8. A player as set forth in claim 6 including means for limiting the relative rotation between said first and second housings.

9. A hand held and guided player for use with a card or the like having a recording medium thereon and comprising;
    a chassis,
    a transducer means,
    drive means extending at least in part below the chassis for supporting the chassis for movement over the recording medium surface,
    means for mounting the transducer means on said chassis in a position so that said transducer means can contact said medium,
    means coupled from said transducer means for producing an audio sound corresponding to a message recorded on the recording medium,
    and a first housing covering said chassis, a second housing that is somewhat elongated in shape and means pivotally interconnecting the first and second housings.

10. A player as set forth in claim 9 wherein said first housing has an indentation at the top thereof for receiving a finger of the user, said second housing being received by the hand of the user.

11. A player as set forth in claim 9 including means for limiting the relative pivoting of the first and second housings.

12. A player as set forth in claim 9 wherein said means for mounting the transducer means includes a bracket connected to the transducer means, a spring connected to the bracket and means mounting the spring to the chassis.

13. A player as set forth in claim 12 wherein said bracket includes an angle bracket and means adjusting the position of said transducer means relative to said bracket.

* * * * *